(12) United States Patent
Stempinski et al.

(10) Patent No.: US 12,528,671 B2
(45) Date of Patent: Jan. 20, 2026

(54) METHOD FOR LIFTING AN OBJECT FROM A VESSEL DECK

(71) Applicant: DEME Offshore BE NV, Zwijndrecht (BE)

(72) Inventors: Florian Uwe Stempinski, Melsele (BE); Benjamin Ward Baert, Vichte (BE); Kenneth Gerard Vannieuwenhuyse, Sint-Amandsberg (BE)

(73) Assignee: DEME Offshore BE NV, Zwijndrecht (BE)

( * ) Notice: Subject to any disclaimer, the term of this patent is extended or adjusted under 35 U.S.C. 154(b) by 968 days.

(21) Appl. No.: 17/638,263

(22) PCT Filed: Aug. 28, 2020

(86) PCT No.: PCT/EP2020/074108
§ 371 (c)(1),
(2) Date: Feb. 25, 2022

(87) PCT Pub. No.: WO2021/038057
PCT Pub. Date: Mar. 4, 2021

(65) Prior Publication Data
US 2022/0289526 A1    Sep. 15, 2022

(30) Foreign Application Priority Data
Aug. 29, 2019   (BE) .................................. 2019/5565

(51) Int. Cl.
*B66C 13/06*    (2006.01)
*B66C 1/10*    (2006.01)
(Continued)

(52) U.S. Cl.
CPC .............. *B66C 13/06* (2013.01); *B66C 1/108* (2013.01); *B66C 23/185* (2013.01); *B66C 23/52* (2013.01);
(Continued)

(58) Field of Classification Search
CPC ....... B66C 13/06; B66C 1/108; B66C 23/185; B66C 23/52; F03D 13/25
See application file for complete search history.

(56) References Cited

U.S. PATENT DOCUMENTS 5,871,249 A   2/1999  Williams
8,938,325 B1 *  1/2015  McGinnis ............... B66C 13/08
                                                         701/4
(Continued)

FOREIGN PATENT DOCUMENTS

JP   H02169493 A    6/1990
JP   5644419 B2   12/2014
(Continued)

OTHER PUBLICATIONS

Translation KR 20160006561.*
Translation JP 2016210607.*

*Primary Examiner* — Shaun R Hurley
(74) *Attorney, Agent, or Firm* — The Webb Law Firm

(57) ABSTRACT

Described is a method for lifting an object from a vessel deck. A hoisting means present on the vessel deck is provided with a hoisting cable to which an attaching means for the object is coupled. The object is connected to the attaching means and then taken up and displaced relative to the vessel deck using the attaching means. The swinging movements of the attaching means and of the object connected thereto, occurring under the influence of wave and wind forces, are damped during displacement by a gyroscope which is connected to the hoisting cable, attaching (Continued)

means and/or object and which includes a rotation-symmetrical body rotating around a primary rotation axis.

14 Claims, 9 Drawing Sheets

(51) Int. Cl.
    *B66C 23/18*         (2006.01)
    *B66C 23/52*         (2006.01)
    *F03D 13/25*         (2016.01)
    *F03D 13/10*         (2016.01)

(52) U.S. Cl.
    CPC ............ *F03D 13/25* (2016.05); *F03D 13/126* (2023.08); *F05B 2230/6102* (2013.01)

(56) References Cited

U.S. PATENT DOCUMENTS

| | | |
|---|---|---|
| 11,021,347 B2 | 6/2021 | Thomson et al. |
| 2015/0368075 A1* | 12/2015 | Clymans ................ B66C 23/52 212/273 |
| 2016/0039500 A1* | 2/2016 | Heyring .............. B63B 17/0081 114/61.15 |
| 2016/0297650 A1 | 10/2016 | Bang |
| 2018/0251346 A1* | 9/2018 | Thomson ................ B66C 13/08 |
| 2019/0186465 A1* | 6/2019 | Borøy .................... F03D 13/25 |
| 2020/0087122 A1 | 3/2020 | Friis et al. |
| 2020/0122981 A1 | 4/2020 | Mastrup et al. |

FOREIGN PATENT DOCUMENTS

| | | | | |
|---|---|---|---|---|
| JP | 2016210607 A | * | 12/2016 | ........... F03D 13/10 |
| KR | 1020150102518 A | | 9/2015 | |
| KR | 20160006561 A | * | 1/2016 | |
| KR | 101607995 B1 | | 3/2016 | |
| WO | WO-2004106215 A1 | * | 12/2004 | ........... B66C 13/063 |
| WO | WO-2009010727 A1 | * | 1/2009 | ............. F16F 15/02 |
| WO | 2015082347 A1 | | 6/2015 | |
| WO | 2017059493 A1 | | 4/2017 | |
| WO | 2018113882 A1 | | 6/2018 | |
| WO | 2018192675 A1 | | 10/2018 | |

* cited by examiner

| | $x_{rms}$ | $y_{rms}$ | $z_{rms}$ | $x_{max}$ | $y_{max}$ | $z_{max}$ |
|---|---|---|---|---|---|---|
| Uncontrolled pendulum | 1.63 | 1.11 | 0.13 | 5.29 | 4.00 | 0.37 |
| Passive gyroscope 150 rpm | 0.37 | 0.39 | 0.11 | 1.40 | 1.46 | 0.34 |
| Active gyroscope 150 rpm | 0.28 | 0.32 | 0.11 | 1.28 | 1.13 | 0.34 |
| Passive gyroscope 180 rpm | 0.24 | 0.26 | 0.11 | 1.14 | 1.12 | 0.36 |
| Active gyroscope 180 rpm | 0.18 | 0.21 | 0.11 | 1.08 | 0.76 | 0.35 |
| Passive gyroscope 200 rpm | 0.16 | 0.18 | 0.11 | 1.08 | 0.80 | 0.35 |
| Active gyroscope 200 rpm | 0.14 | 0.16 | 0.11 | 1.00 | 0.53 | 0.36 |

METHOD FOR LIFTING AN OBJECT FROM A VESSEL DECK

CROSS-REFERENCE TO RELATED APPLICATIONS

This application is the United States national phase of International Application No. PCT/EP2020/074108 filed Aug. 28, 2020, and claims priority to Belgian Patent Application No. 2019/5565 filed Aug. 29, 2019, the disclosures of which are hereby incorporated by reference in their entirety.

BACKGROUND OF THE INVENTION

Field of the Invention

The present invention relates to a method for lifting an object from a vessel deck, wherein a hoisting means on the vessel deck comprises a hoisting cable which is provided at an outer end with an attaching means for the object, wherein the object is connected to the attaching means and the object is taken up and displaced relative to the vessel deck using the attaching means.

The invention will be described partly in respect of an offshore wind turbine. The reference to such a wind turbine however does not imply that the invention is limited to taking up and displacing wind turbine components, and the method can likewise be applied for taking up and displacing any other object, particularly a large and slender object.

Description of Related Art

The taking up and displacing of an object from a vessel deck can for instance be applied during the placing of a wind turbine at sea. Components of the wind turbine must be placed from a vessel deck onto a support structure placed at sea, and this entails taking up and displacing of the wind turbine component from a vessel deck. An offshore wind turbine comprises a gondola (or nacelle) which is placed on a mast and forms the housing for electromechanical equipment such as a power generator. The nacelle is provided with a hub on which a number of rotor blades are arranged. The rotor blades convert the kinetic energy of the wind into a rotating movement of the shaft of the nacelle, which is converted into electrical energy by the power generator. Depending on the stage of construction, the support structure can, in the case of a wind turbine, comprise a foundation, a mast placed on the foundation or a nacelle placed on the mast. A mast, a nacelle or a turbine blade must then respectively be placed here.

The lifting and placing of objects such as said wind turbine components is hampered by wind and wave load. This will increasingly be the case the greater and slenderer the object is. Wind turbine blades in particular catch a lot of wind. Wind turbine blades attached to the hoisting means can be exposed here to great and unexpected movements relative to the support structure or relative to already installed components. This makes the operations considerably more difficult, or even impossible in the case of strong wind load. In addition, the objects are taken up from a vessel deck, wherein the vessel is subject to movements caused by wave action.

A vessel floating on water is exposed to movements having 6 degrees of freedom, including three translating movements and three rotation movements. In a Cartesian coordinate system coupled to the vessel deck an x-axis runs parallel to the longitudinal direction of the vessel, a y-axis parallel to a transverse direction of the vessel and a z-axis parallel to a direction running perpendicularly of the vessel deck. A translation of the vessel in the x-direction is referred to as surge, a translation of the vessel in the y-direction as sway and a translation of the vessel in the z-direction as heave. A rotation of the vessel around the x-axis is referred to as roll, a rotation around the y-axis as pitch, and a rotation around the z-axis as yaw. All these movements can induce swinging movements of an object suspended from the hoisting means, particularly in that a hoisting means present on the vessel deck will follow the vessel movements.

WO 2018/113882A1 discloses an assembly for rotating a suspended load such as wind turbine related components around a vertical axis. The assembly comprises an inner rim to which the load is suspended and an outer rim that may be held in a fixed position. A drive rotates the inner rim and the load suspended from it relative to the outer rim.

KR 101607995 discloses a method for controlling the orientation of a turbine blade by means of two oppositely rotating discs. When loaded by external forces, such as wind forces, orientation of the blade is controlled by increasing or decreasing the speed of one of the rotating discs. KR 101607995 is silent about damping the swinging movements during displacement of a turbine blade or other object occurring under the influence of wave and wind forces.

JPH02169493 and JP5644419 likewise disclose a method for controlling the direction and tilt of a load by means of two gyroscopes and a control device. This document also is silent about damping the swinging motions of a load suspended from a rope.

WO2017/059493 also discloses a method for controlling the orientation of a lifted load by means of two or more gyroscopes. WO2017/059493 also is not related to a method for damping the swinging movements of a suspended load. The same holds for WO 2015/082347.

U.S. Pat. No. 5,871,249 finally discloses a gyroscopically stabilized positioning system that is resistant to external forces. A plurality of drivable flywheels is rigidly engaged to a suspended load, and each arranged along one of a set of three orthogonal space axes. These axes are fixed with respect to the hoisting cable direction.

The vessel from which the object is taken up and displaced can comprise a jack-up platform, wherein the legs of the jack-up platform resting on the seabed provide for some stability. The advantages of the invention however become most clearly manifest when the vessel is a floating vessel.

SUMMARY OF THE INVENTION

An object of the present invention is to provide a method with which, using an attaching means, an object can be taken up and displaced relative to a vessel deck at sea, and can optionally be placed and mounted on a support structure present in the sea, in a manner less susceptible to wind than is known in the prior art.

This object is achieved by providing a method described herein. The invention particularly provides a method for lifting an object from a vessel deck, wherein a hoisting means on the vessel deck comprises a hoisting cable which is provided at an outer end with an attaching means for the object. The object is connected to the attaching means and then taken up and displaced relative to the vessel deck using the attaching means. The swinging movements of the attaching means and of the object connected thereto, occurring under the influence of wave and wind forces, are damped during displacement by a gyroscope which is connected to the hoisting cable, attaching means and/or object and which comprises a rotation-symmetrical body rotating around a primary rotation axis.

The gyroscope damps the swinging movements, occurring due to wave and wind forces, of the attaching means and of the object connected thereto, which is understood to mean that an amplitude of the swinging movements in different directions is lower than the amplitude of these swinging movements when the gyroscope is not used. In this way an object can be manipulated with a hoisting means from a vessel deck in rougher weather conditions than is possible according to the prior art.

A gyroscope is per se known and is for instance applied in vessels for the purpose of reducing rolling movements (roll) of the vessel. This involves controlling a movement in one single direction. An object suspended in a hoisting cable is however subject to movements in all directions, caused by the above stated vessel movements (surge, sway, heave, roll, pitch and yaw), and wind forces. It is surprising that a single gyroscope connected to the hoisting cable, attaching means and/or object is able to damp the swinging movements in all directions in effective manner. Damping the swinging of an object suspended from a lifting means achieves that the position of the object becomes more accurate during displacement of the object relative to the vessel deck. Such a displacement can be achieved by displacing the part of the lifting means to which the hoisting cable is connected (for instance an outer end of a boom) relative to the vessel deck. This movement can also cause additional swinging movements of the suspended object.

A gyroscope comprises a rotation-symmetrical body rotating around a primary rotation axis. This rotating body is set into rotation with a drive suitable for this purpose, wherein the rotation speed can be kept constant or can be varied, for instance accelerated. The body can be disc-like (for instance a flywheel), but can also take on a different form, such as for instance a spherical form. The body is received via the primary rotation shaft in a suspension suitable for this purpose, for instance in a frame or housing.

Excellent results are achieved with an embodiment of the invented method wherein the primary rotation axis of the gyroscope is held parallel to the hoisting cable direction. This can be achieved by applying a gyroscope wherein the primary rotation axis is held substantially parallel to a current direction of the swinging hoisting cable.

Another embodiment of the method has the feature that the primary rotation axis of the gyroscope is held at an angle of inclination other than zero to the current hoisting cable direction.

Yet another embodiment relates to a method wherein the angle of inclination is varied linearly with the current angle of swing between the hoisting cable direction and the z-direction running perpendicularly of the vessel deck.

An embodiment of the method wherein the speed of rotation of the body rotating around the primary rotation axis is increased as an amplitude of the swinging movement increases has been found to result in a further stabilization of the suspended object.

The invented method can be applied in different stages of the manipulation of an object connected to the attaching means. Provided in particular is an embodiment of the method wherein the swinging movements of the attaching means and of the object connected thereto are damped by the gyroscope during taking up of the object from the vessel deck. During transport over sea objects are usually situated on the vessel deck in a storage provided for this purpose. An object must be taken up from such a storage, wherein the hoisting cable can have a maximum length when taking up and the hoisting cable can be hauled in to a minimum length during lifting. It has been found that the gyroscope also operates well and prevents swinging movements of the object in this stage of the manipulation, also during hauling in of the hoisting cable. This enhances the safety on the vessel deck.

According to another embodiment, the invented method can also applied such that the taken-up and displaced object is lowered and mounted on a support structure for the object present in the surrounding water, and the swinging movements of the attaching means and of the object connected thereto are damped by the gyroscope during lowering and/or mounting of the object on the support structure. It is important here to consider that the support structure is generally in a relatively stable position relative to the seabed, and the suspended object thus moves relative to the support structure. The method according to the present embodiment ensures that this relative movement is damped.

Yet another embodiment of the invention provides a method wherein the hoisting means comprises a boom, to an outer end of which the hoisting cable is connected, and the boom is rotated, at least during displacement of the object, around a rotation axis running perpendicularly of the vessel deck. Such a method of lifting, wherein a suspension point (an outer end of the boom to which the hoisting cable is attached) itself is moved, can cause additional swinging movements of the object due to this movement. A good damping of the swinging movements is also achieved in this embodiment.

A further improved method relates to an embodiment in which the swinging movements of the attaching means and of the object connected thereto are damped further by connecting tugger lines on one side to the attaching means and/or to the object connected thereto, and holding the tugger lines on another side, preferably from the vessel deck. In this embodiment the swinging movements can further be damped by taking in or paying out the tugger lines.

Yet another embodiment relates to a method wherein the swinging movements of the attaching means and of the object connected thereto are damped by the tugger lines in a direction other than the direction in which the gyroscope produces a maximum damping of the swinging movements.

It can have further advantages here to apply a method according to an embodiment wherein an (x, y, z-)coordinate system is connected to the vessel deck, wherein the x-axis runs in a longitudinal direction of the vessel, the y-axis in a transverse direction of the vessel, and the z-axis in a direction running perpendicularly of the vessel deck, wherein the vessel is held with the x-axis substantially parallel to the wave direction and the swinging movements of the attaching means and of the object connected thereto are damped substantially parallel to the y-axis using the tugger lines.

According to the invention, the gyroscope can be attached to any component suspended from the hoisting cable, in addition to a possible attachment to the hoisting cable itself. In a practical embodiment of the method the attaching means comprises the gyroscope. The attaching means can comprise a spreader bar from which the object is suspended, or the attaching means can comprise a hoisting block.

According to an embodiment, a method is provided wherein the body of the gyroscope rotating around the primary rotation axis is received in a frame or housing, wherein the body is driven rotationally by drive means and wherein the frame or the housing is connected, optionally fixedly, to the hoisting cable, the attaching means and/or the object. The connection can also be realized by means of slings or cables.

With the invented method any object suspended from a hoisting cable can in principle be manipulated from a vessel deck. The invention has particular advantages in an embodiment of the method wherein the object comprises a mast section, a rotor blade and/or the nacelle of a wind turbine, more particularly wherein the object comprises the nacelle with hub of a wind turbine, and the hub is provided with a rotor blade, preferably three rotor blades.

The embodiments of the invention described in this patent application can be combined in any possible combination of these embodiments, and each embodiment individually can form the subject matter of a divisional patent application.

BRIEF DESCRIPTION OF THE DRAWINGS

The invention will now be further elucidated with reference to the following figures and description of preferred embodiments, without the invention otherwise being limited thereto. In the figures.

DESCRIPTION OF THE INVENTION

Figure 1:
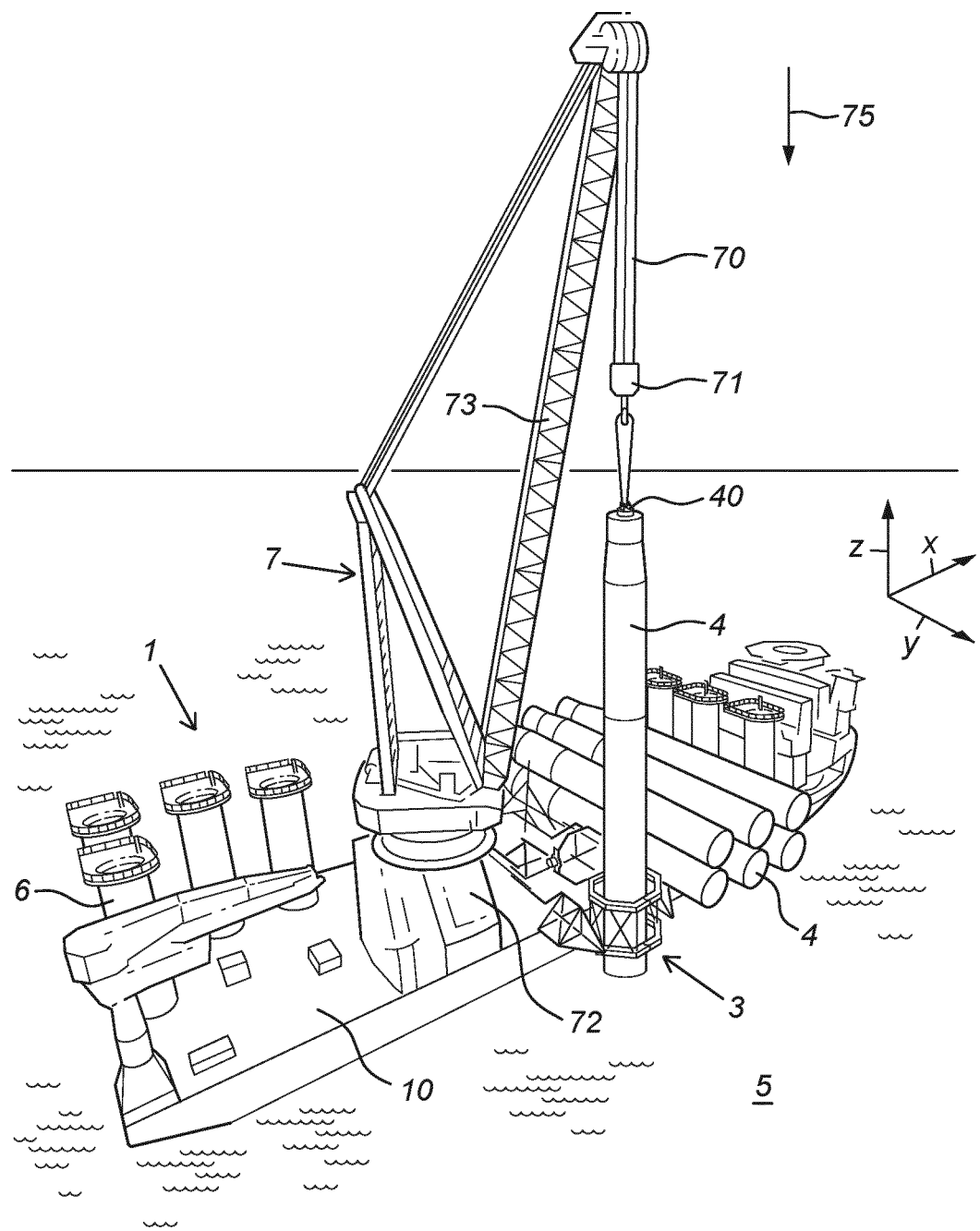
FIG. 1 shows a schematic perspective view of a floating vessel configured to lift an object from its vessel deck as according to an embodiment of the invention.

Referring to FIG. 1, a vessel 1 is shown which is configured specifically to arrange a foundation for a wind turbine in the form of a monopile 4 in an underwater bottom 5. If desired, vessel 1 can be equipped with a dynamic positioning system (DP System) to stabilize its position. Work deck 10 of vessel 1 supports a hoisting means in the form of a lifting crane 7, provided with a base 72 which is pivotable around a vertical axis and on which is mounted a boom 73 pivotable around a horizontal axis. Lifting crane 7 is provided with hoisting cables 70 to which an attaching means in the form of a hoisting block 71 with hook is attached. Monopile 4 can be attached to hoisting block 71 at a lifting point 40 and then be taken up by lifting crane 7, and be displaced relative to work deck 10. The monopile 4 suspended from hoisting cables 70 can for instance be displaced by rotating base 72, wherein boom 73 will swing over work deck 10, and/or by rotating boom 73 upward (luffing in) or downward (luffing out), wherein monopile 4 is respectively taken up and lowered. In order to finally lower monopile 4 into underwater bottom 5 a guide cage 3 arranged on a side of vessel 1 can be used. Other components to be manipulated can be stored on work deck 10 of vessel 1, such as a number of transition pieces 6 of a wind turbine and other monopiles 4.

It will be apparent that the lifting and placing of the monopile 4 is hampered by wind load, wherein vessel 1 is also subject to movements caused by wave action. The freely suspended monopile 4 taken up with lifting crane 7 can be exposed to great and unexpected swinging movements relative to word deck 10, guide cage 3 and underwater bottom 5. This makes the operations considerably more difficult, or even impossible in the case of strong wind load.

Figure 2A:
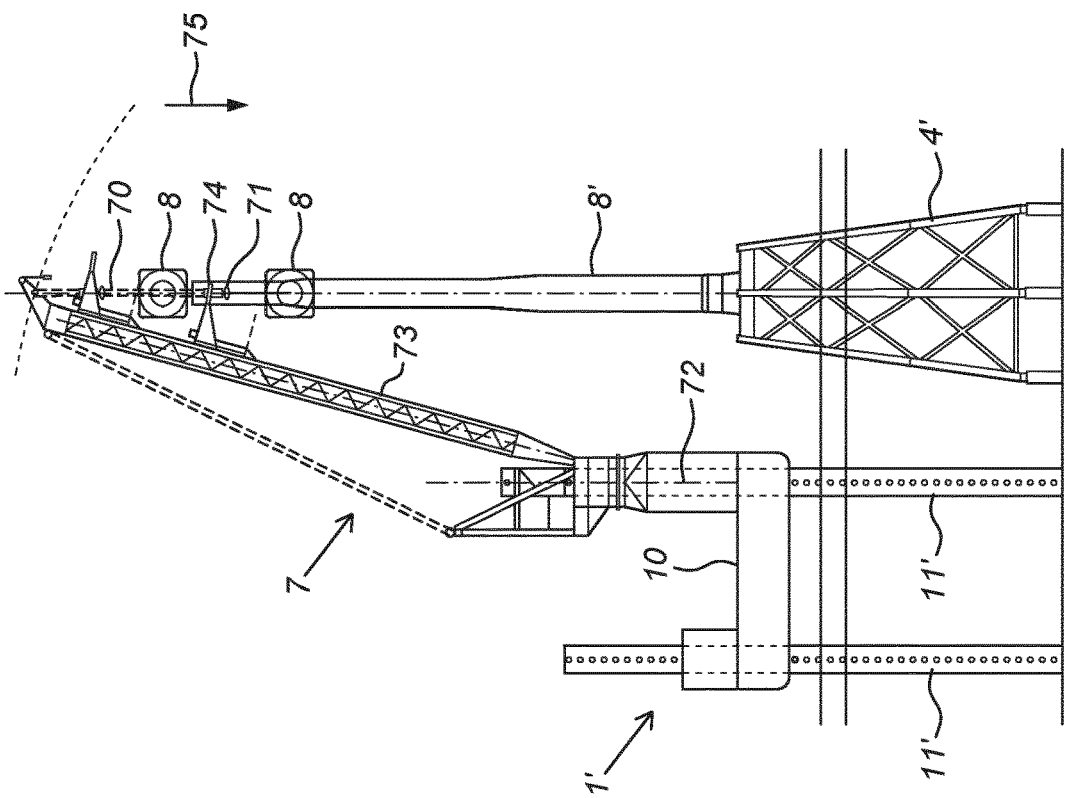
FIGS. 2A-2B show a schematic side view and rear view of a jack-up platform configured to lift an object and to place the object on a support structure as according to an embodiment of the invention, in different states.
Figure 2B:
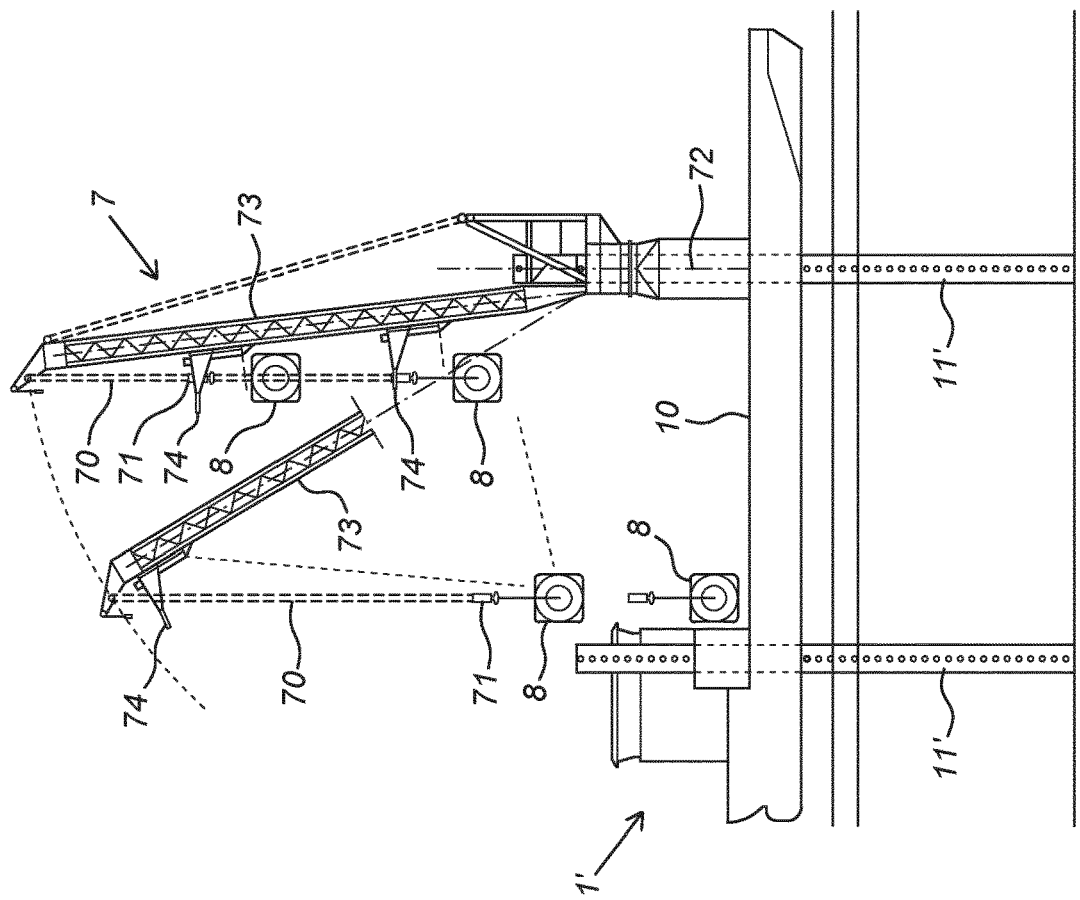

Another application relates to the placing of wind turbine components such as a nacelle 8 on a support structure in the form of a jacket 4' which is already arranged in underwater bottom 5. Referring to FIGS. 2A and 2B, a side view is shown of a vessel 1' configured to assemble a wind turbine on jacket 4' at sea. The components of the wind turbine to be placed can comprise a nacelle 8, which is shown in different positions in FIGS. 2A-2B, a mast (section) 8', and/or rotor blades of the wind turbine (not shown). Vessel 1' is substantially provided with the same devices as vessel 1, such as for instance a lifting crane 7. For this reason similar devices are numbered the same as in FIG. 1. In FIGS. 2A-2B hoisting tackle 71 is likewise shown in different positions and the component to be lifted is a nacelle 8. Vessel 1' comprises a jack-up offshore platform which is provided with anchor piles 11' which support a work deck 10. Anchor piles 11' are movable to the seabed in vertical direction, and the height position of work deck 10 relative to the water level can be changed by displacing work deck 10 relative to piles 11' by means of (hydraulic) jacks or a gear rack-pinion drive system. In order to enable the method according to the invention to be performed the vessel 1' is moored in the immediate vicinity of a jacket 4' present at sea, and in any case such that jacket 4' lies within reach of lifting crane 7 with boom 73 in luffed-out position.

If desired, boom 73 can comprise a guide device 74 for the hoisting tackle 71, whereby the movement of hoisting tackle 71 can be limited in at least one direction. This is however not essential for the invention.

In both above stated illustrative applications swinging movements of hoisting tackle 71 and of the nacelle 8 connected thereto occurring under the influence of wave and wind forces are according to the invention damped during displacement by a gyroscope 2 which is connected to hoisting tackle 71 or nacelle 8 itself and which comprises a rotation-symmetrical body rotating around a primary rotation axis.

Figure 5:
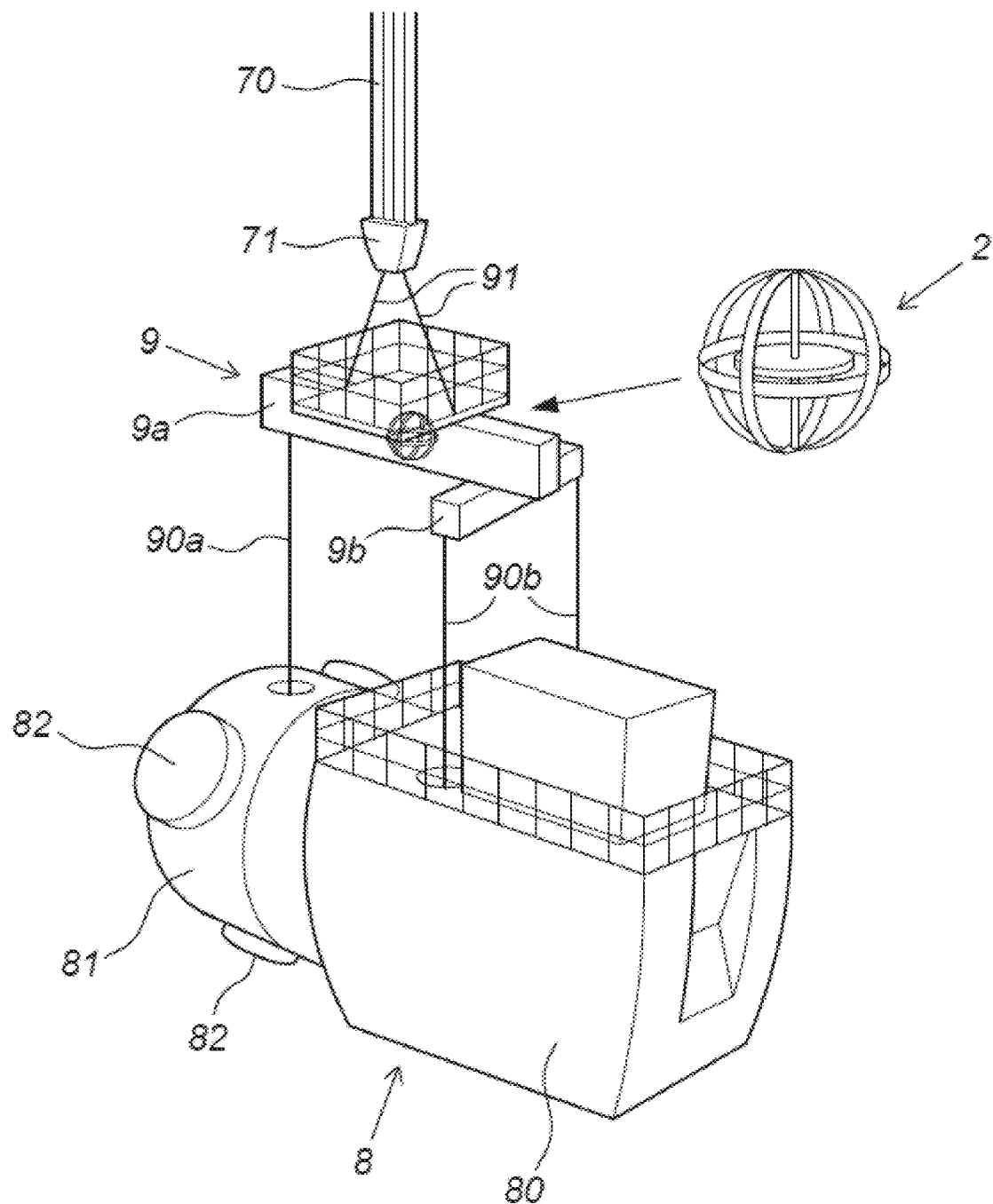
FIG. 5 shows a schematic perspective view of a wind turbine nacelle suspended from an attaching means as according to an embodiment of the invention.

A possible connection between hoisting cable 70 and for instance nacelle 8 is shown in FIG. 5. Nacelle 8 comprises a housing 80 and a rotatable hub 81 which connects to housing 80 and has mounting points 82 for wind turbine blades. Nacelle 8 is suspended by wires (90a, 90b) from an attaching means 9, this comprising in the shown embodiment a first spreader bar 9a and a second spreader part 9b arranged perpendicularly thereof, these together forming a cross-shaped structure. Nacelle 8 is suspended with wires (90b, 90a) running respectively between housing 80 and second spreader bar 9b and between hub 81 and first spreader bar 9a. According to this embodiment, first spreader bar 9a is provided with a gyroscope 2.

Figure 6:
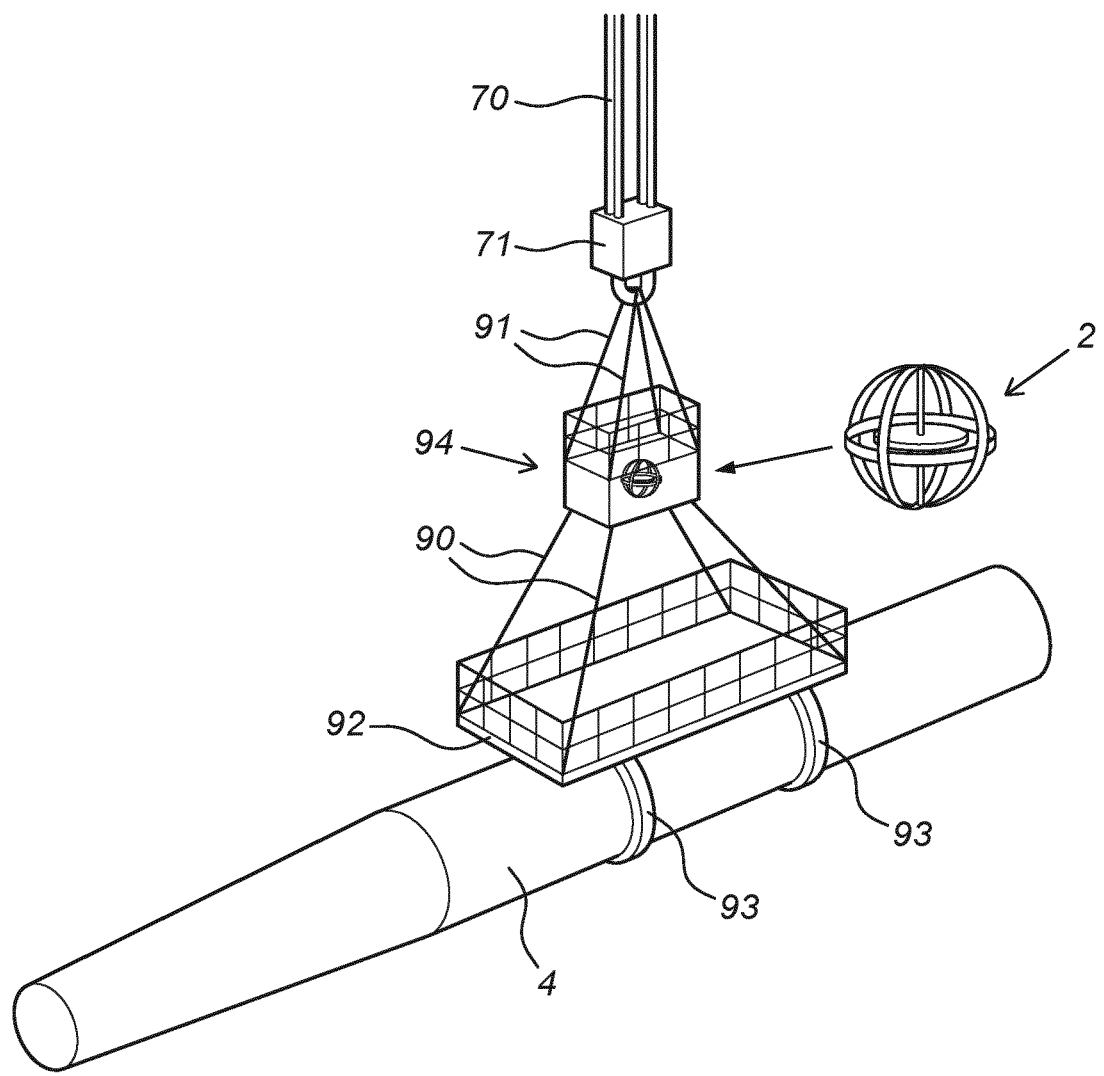
FIG. 6 shows a schematic perspective view of a monopile foundation for a wind turbine suspended from an attaching means as according to an embodiment of the invention.

A possible connection between hoisting cable 70 and a monopile foundation 4 is shown in FIG. 6. Monopile 4 is suspended in slings 93, wherein slings 93 are connected to a spreader bar (not visible) which is provided on an upper side with a work platform 92. The spreader bar is in turn connected with slings or cables 90 to a housing 94 for a gyroscope 2. Housing 94 is in turn suspended with slings or cables 91 from the hook of hoisting block 71 (also referred to as hoisting tackle 71). According to this embodiment, housing 94 comprises a gyroscope 2.

Figures 7, 8:
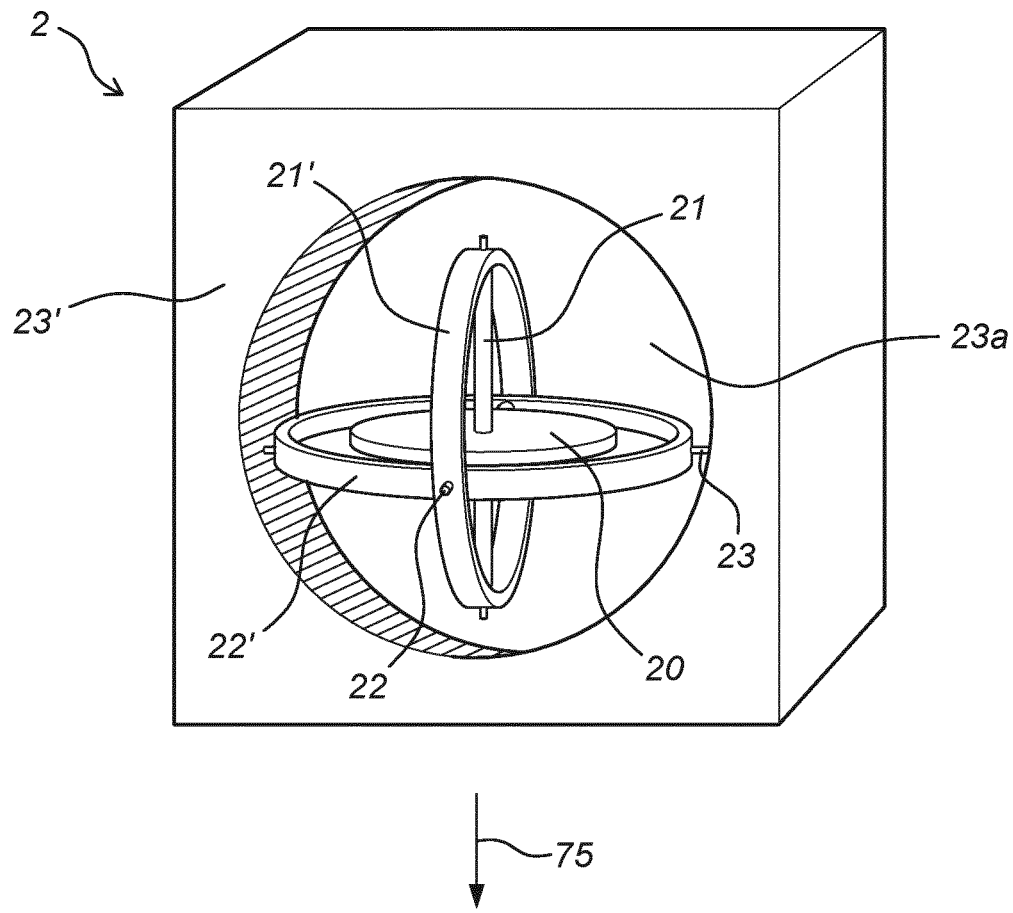
FIG. 7 shows a schematic perspective view of an embodiment of a gyroscope configured for application in the method according to the invention.
FIG. 8 shows a comparative table which clarifies the damping effect of an embodiment of the gyroscope on swinging movements of a suspended object.

A possible embodiment of a gyroscope 2 received in a housing 94 or spreader bar 9a is shown in FIG. 7. Gyroscope 2 comprises a body which rotates around a primary shaft 21 and takes the form of a rotation-symmetrical flywheel 20. Primary shaft 21 is suspended rotatably in a first annular suspension 21'. The first annular suspension 21' is received in a second annular suspension 22', optionally rotatably around a secondary shaft 22. This second annular suspension 22' is suspended, optionally rotatably, in a third suspension 23' with a tertiary shaft 23. In the shown embodiment the third suspension 23' comprises a block provided with a central opening 23a, in which opening 23a the gyroscope 2 is received. The block-shaped suspension 23' is arranged in a spreader bar 9a, a housing 94 or another recipient, and anchored rigidly thereto. It is important here that gyroscope 2 is anchored such that the primary rotation shaft 21 runs substantially vertically, in other words runs parallel to the direction 75 of a freely suspended (vertically directed) hoisting cable 70 (or alternatively a plane of the flywheel 20 runs substantially perpendicularly of the direction of a freely suspended hoisting cable 70).

The couplings between the first 21' and second annular suspension 22' and the third suspension 23' can be freely rotatable but can also each be placed in a fixed position. In the shown embodiment the coupling between the first 21' and the second annular suspension 22' is fixed so that the two rings (21', 22') run orthogonally relative to each other. In this state, referred to as passive, primary shaft 21 of the gyroscope will remain running substantially parallel to the current direction 76 of the swinging hoisting cable 70 in the event of a swinging movement. The coupling between the first 21' and the second annular suspension 22' can also be fixed so that the two rings (21', 22') run at an angle 24 other than an orthogonal angle relative to each other. In this state, referred to as active, the primary shaft 21 of gyroscope 2 will run substantially at said angle 24 relative to the current direction 76 of the swinging hoisting cable 70 in the event of a swinging movement. Yet another option lies in releasing the coupling between the first 21' and the second annular suspension 22' so that the two rings (21', 22') can rotate freely relative to each other. In the above stated embodiments the coupling between the second annular suspension 22' and the third suspension 23' can be fixed or be released. Releasable couplings for a gyroscope are readily available.

Figure 3:
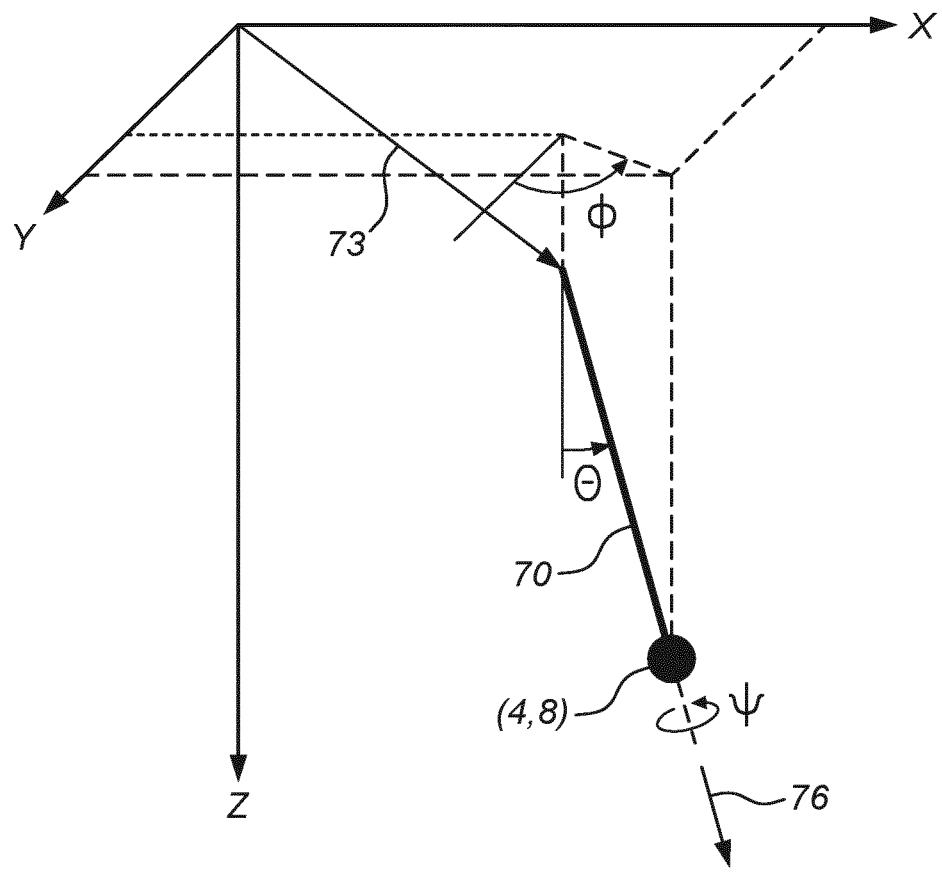
FIG. 3 shows a schematic representation of the degrees of freedom of an object suspended from a boom of a hoisting means as according to the prior art.

Referring to FIG. 3, an object (4, 8) suspended from a boom 73 with hoisting cable 70 is shown. A Cartesian (x, y, z-)coordinate system connected to vessel deck 10 is likewise shown. The origin of the (x, y, z-)coordinate system lies at the position of the base 72 of boom 73, or at least in the point around which boom 73 can rotate around base 72. The x-axis runs in a longitudinal direction of the ship, the y-axis in a transverse direction of the ship and the z-axis in a direction running perpendicularly of vessel deck 10. As shown, under the influence of wave and wind forces a suspended object (4, 8) will behave as a pendulum and undergo a swinging movement with substantially three degrees of freedom: an angle θ between hoisting cable 70 and the z-axis, an azimuth angle ψ, and an angle of rotation φ of the object (4, 8) around an axis parallel to the current direction 76 of hoisting cable 70.

Figure 4A:
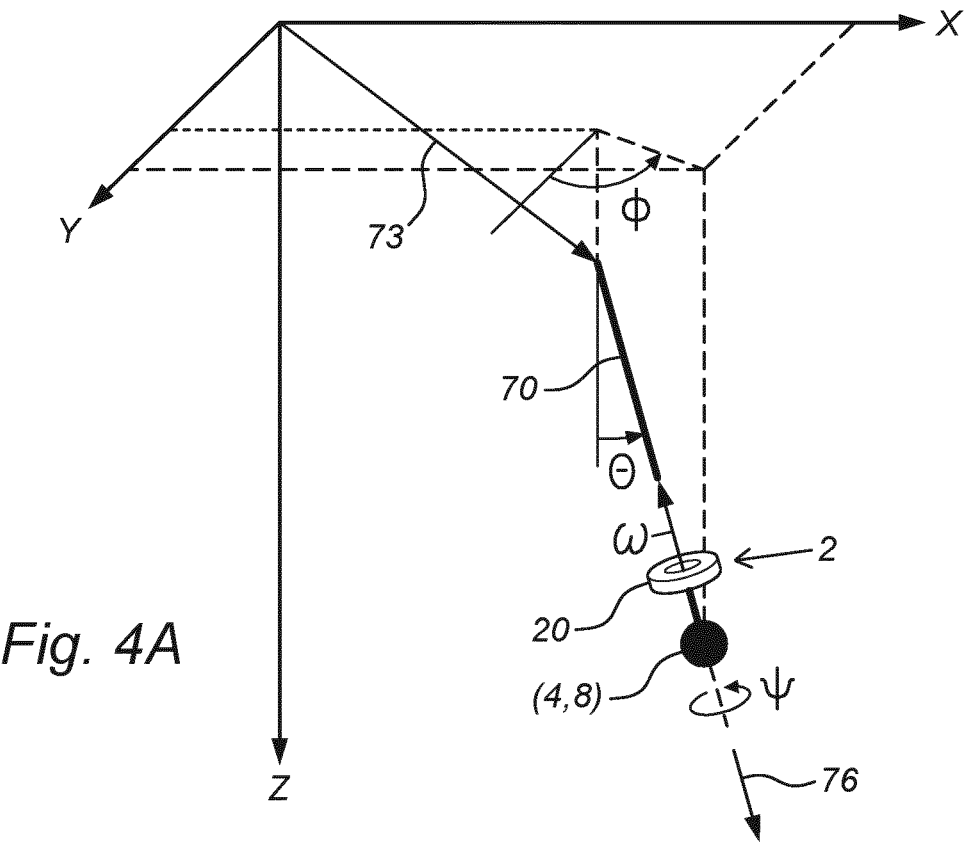
FIGS. 4A and 4B show schematic representations of the degrees of freedom of an object suspended from a boom of a hoisting means as according to two embodiments of the invention.
Figure 4B:
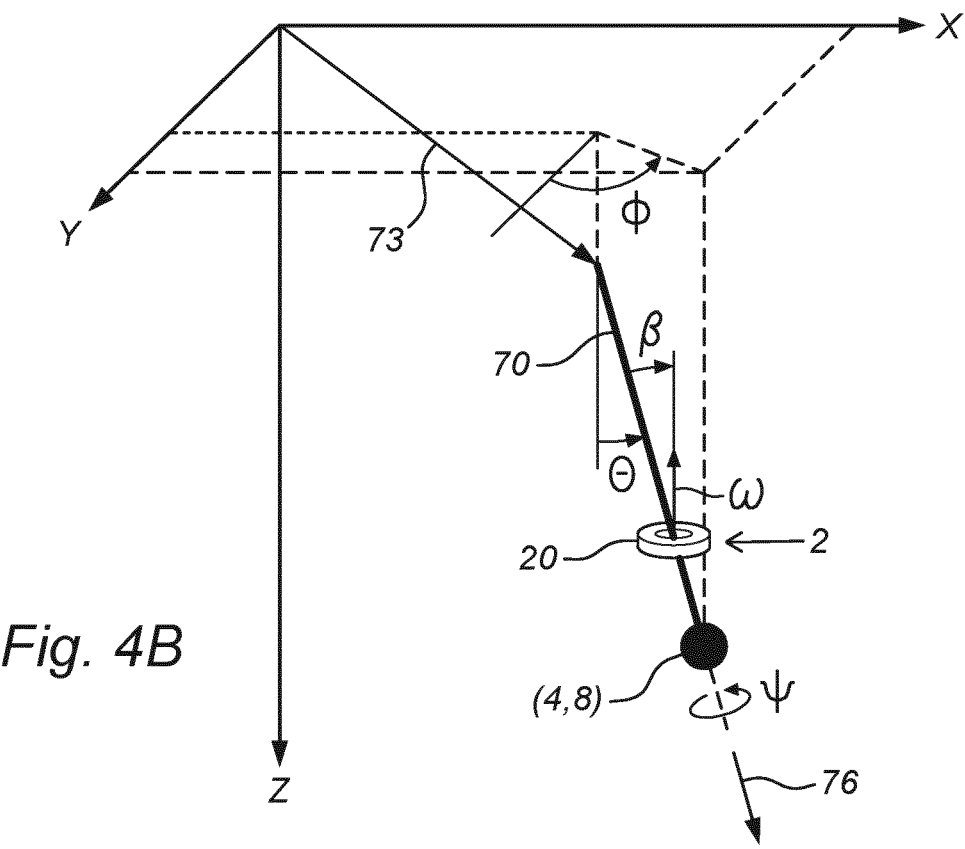

FIGS. 4A and 4B show embodiments of the invented method wherein a gyroscope 2 is incorporated in the hoisting cable 70, for instance in a connecting means 9 for the object (4, 8). In FIG. 4A a method is shown wherein gyroscope 2 is operated in the above described passive state, wherein the primary shaft 21 of gyroscope 2 will remain running substantially parallel to the current direction 76 of the swinging hoisting cable 70 in the event of a swinging movement. In other words, the rotation vector $\bar{\omega}$ of flywheel 20 is directed parallel to the direction 76, as shown. FIG. 4B shows a method wherein gyroscope 2 is operated in the above described active state, wherein the primary shaft 21 of gyroscope 2 remains running at an angle other than zero to the current direction 76 of the swinging hoisting cable 70 in the event of a swinging movement. In other words, the rotation vector $\bar{\omega}$ of flywheel 20 forms here an (acute) angle of inclination β other than zero with the z-axis.

The effect of gyroscope 2 in the lifting and displacing of an object such as a monopile 4, a nacelle 8 or a mast section 8' of a wind turbine is illustrated by the table included in FIG. 8. This shows the root mean square ('rms') displacement of the object (4, 8) in the x, y and z-directions in the first three columns, and the maximum displacement occurring in these directions in the final three columns. The first row ('uncontrolled pendulum') shows the displacement according to the prior art method. The second and third row ('passive gyroscope 150 rpm', 'active gyroscope 150 rpm') show the displacements when the invented method is applied, wherein gyroscope 2 is operated in respectively passive and active state at a rotational speed of 150 revolutions per minute ('rpm'). The fourth and fifth row ('passive gyroscope 180 rpm', 'active gyroscope 180 rpm') show the displacements when the invented method is applied, wherein gyroscope 2 is operated in respectively passive and active state at a rotational speed of 180 revolutions per minute ('rpm'). Finally, the sixth and seventh row ('passive gyroscope 200 rpm', 'active gyroscope 200 rpm') show the displacements when the invented method is applied, wherein gyroscope 2 is operated in respectively passive and active state at a rotational speed of 200 revolutions per minute ('rpm'). It will be apparent that all displacements are noticeably reduced (mainly in the x and y-direction) relative to the known method (first row).

Figures 9A, 9B, 9C:
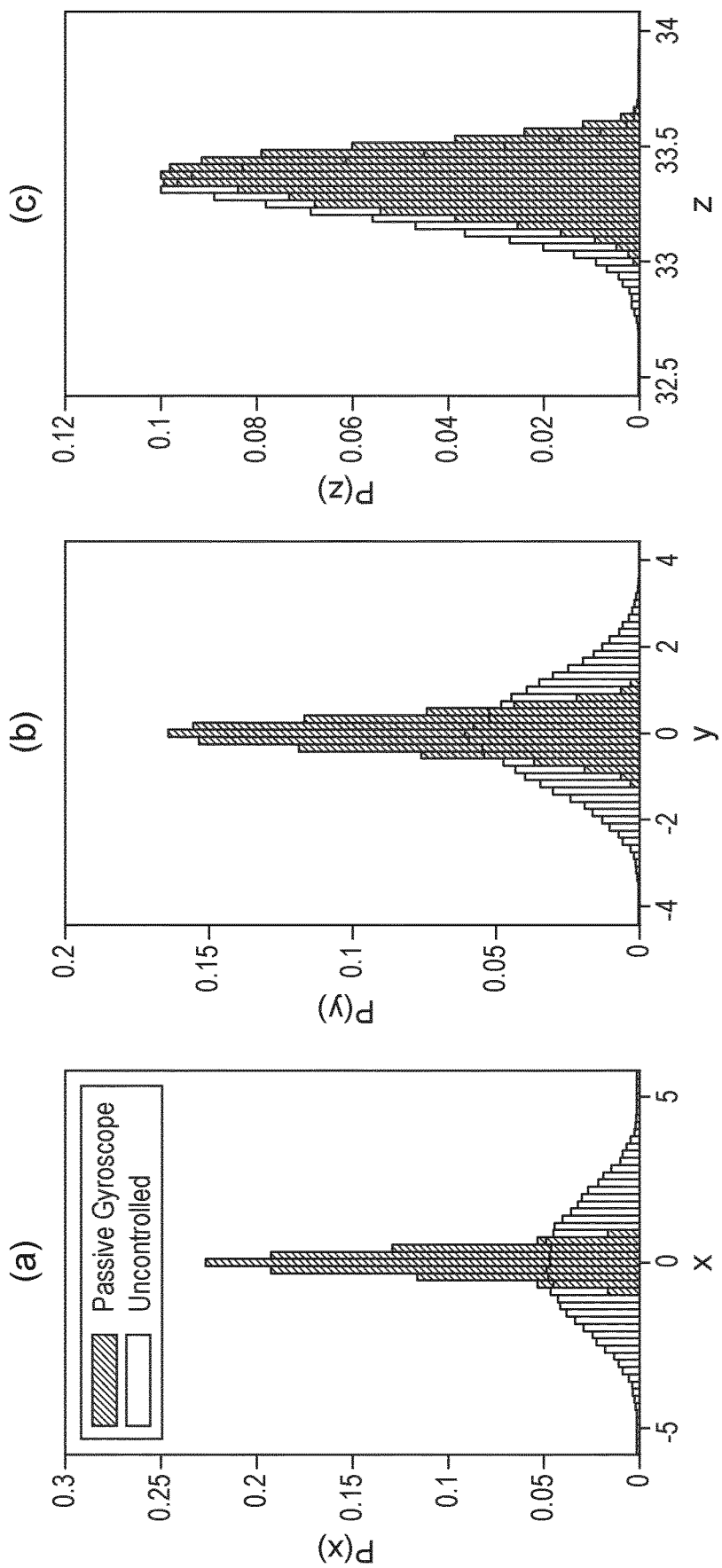
FIGS. 9A, 9B and 9C show the probability distribution of the position in the x, y and z-direction of an object suspended as according to the prior art and as according to embodiments of the invention; and, finally

This effect is also visible in FIGS. 9A, 9B and 9C, in which the probability P(x, y, z) of positions of the object (4, 8) in the x, y and z-direction are shown as a function of the displacement. A method according to the invention has been found to noticeably reduce the amplitude of the swinging movement, mainly in the x and the y-direction. The swinging movement is thus damped efficiently.

Figure 10:
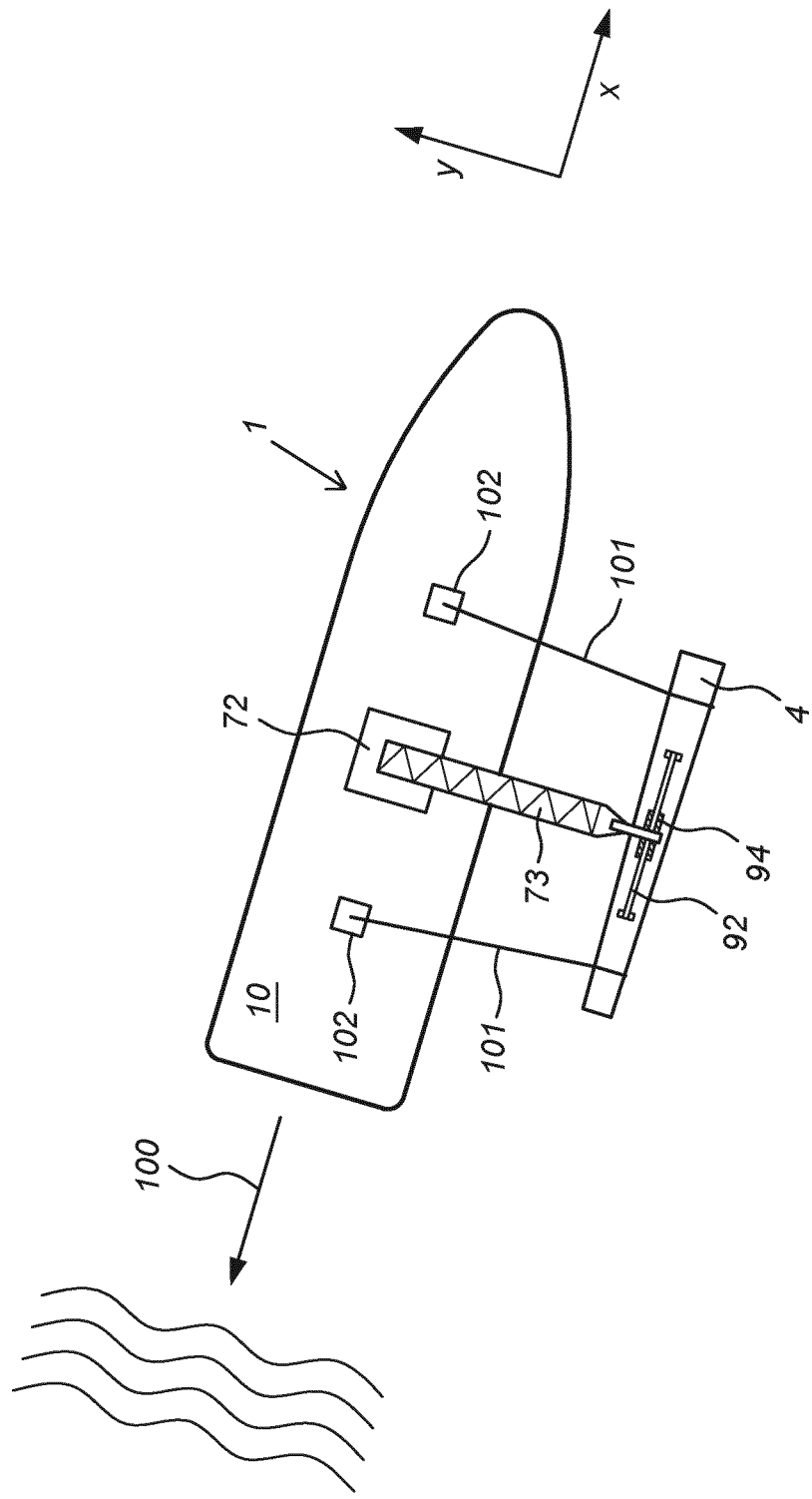
FIG. 10 shows a schematic top view of a method according to a specific embodiment of the invention.

Finally, FIG. 10 illustrates a preferred method in which the floating vessel 1 is held with the x-axis (the longitudinal direction of the ship) substantially parallel to the mean wave direction 100, for instance by an anchoring suitable for this purpose. The swinging movements of the fastening means in the form of spreader bar 92 and of the object in the form of a monopile 4 connected thereto are damped substantially parallel to the y-axis (the transverse direction of the ship) using tugger lines 101. For this purpose tugger lines 101 are connected to winches 102 anchored to work deck 10, wherein the winches 102 are able to pay out or take in the tugger lines. The swinging movements in the x-direction are damped by a gyroscope 2 received in housing 94, as described above.

The invention is not limited to the embodiments shown in the figures, and many variants thereof are possible within the scope of protection of the appended claims.

The invention claimed is:

1. A method for lifting an object from a vessel deck and transporting the object, wherein a hoisting means on the vessel deck comprises a hoisting cable which is provided at an outer end with an attaching means for the object, wherein the object is connected to the attaching means and the object is taken up and displaced relative to the vessel deck using the attaching means, wherein the swinging movements of the attaching means and of the object connected thereto, occurring under the influence of wave and wind forces, are damped during displacement by a gyroscope which is connected to the hoisting cable, attaching means, or object, and which comprises a rotation-symmetrical body rotating around a primary rotation axis, wherein the primary rotation axis of the gyroscope is held at an angle of inclination other than zero to the hoisting cable direction, wherein the angle of inclination is varied linearly with the current angle of swing between the hoisting cable direction and a z-direction running perpendicularly of the vessel deck.

2. The method according to claim 1, wherein the speed of rotation of the body rotating around the primary rotation axis is increased as an amplitude of the swinging movement increases.

3. The method according to claim 1, wherein the swinging movements of the attaching means and of the object connected thereto are damped by the gyroscope during taking up of the object from the vessel deck.

4. The method according to claim 1, wherein the taken-up and displaced object is lowered and mounted on a support structure for the object present in the surrounding water, and the swinging movements of the attaching means and of the object connected thereto are damped by the gyroscope during lowering and/or mounting of the object on the support structure.

5. The method according to claim 1, wherein the hoisting means comprises a boom, to an outer end of which the hoisting cable is connected, and the boom is rotated, at least during displacement of the object, around a rotation axis running perpendicularly of the vessel deck.

6. The method according to claim 1, wherein the swinging movements of the attaching means and of the object connected thereto are damped further by connecting tugger lines on one side to the attaching means and/or to the object connected thereto, and holding the tugger lines on another side, wherein the swinging movements are further damped by taking in or paying out the tugger lines.

7. The method according to claim 6, wherein the swinging movements of the attaching means and of the object connected thereto are damped by the tugger lines in a direction other than the direction in which the gyroscope produces a maximum damping of the swinging movements.

8. The method according to claim 6, wherein an (x, y, z-)coordinate system is connected to the vessel deck, wherein the x-axis runs in a longitudinal direction of the vessel, the y-axis in a transverse direction of the vessel, and the z-axis in a direction running perpendicularly of the vessel deck, wherein the vessel is held with the x-axis substantially parallel to the wave direction and the swinging movements of the attaching means and of the object connected thereto are damped substantially parallel to the y-axis using the tugger lines.

9. The method according to claim 1, wherein the attaching means comprises the gyroscope.

10. The method according to claim 1, wherein the attaching means comprises a spreader bar from which the object is suspended.

11. The method according to claim 1, wherein the attaching means comprises a hoisting block.

12. The method according to claim 1, wherein the body of the gyroscope rotating around the primary rotation axis is received in a frame, wherein the body is driven rotationally by drive means and wherein the frame is connected fixedly to the hoisting cable, the attaching means and/or the object.

13. The method according to claim 1, wherein the object comprises a mast section, a rotor blade and/or the nacelle of a wind turbine.

14. The method according to claim 13, wherein the object comprises the nacelle with hub of a wind turbine, and the hub is provided with a rotor blade.

* * * * *